United States Patent [19]

Sim et al.

[11] 3,906,087

[45] Sept. 16, 1975

[54] SUSTAINED RELEASE OF METHANTHELINE

[75] Inventors: James S. Y. Sim; Maurice H. Van Horn; Arthur I. Cohen; Stanley E. Gordesky; Stanley I. Gordon, all of Rochester, N.Y.

[73] Assignee: Union Corporation, Verona, Pa.

[22] Filed: Sept. 10, 1973

[21] Appl. No.: 395,862

[52] U.S. Cl. ................................ 424/22; 424/81
[51] Int. Cl.$^2$ ........................................ A61K 27/12
[58] Field of Search .......................... 424/19–22, 424/81

[56] References Cited
UNITED STATES PATENTS
3,577,512   5/1971   Shepherd et al. ................... 424/21

*Primary Examiner*—Shep K. Rose
*Attorney, Agent, or Firm*—Pollock, Philpitt & Vande Sande

[57] ABSTRACT

A sustained release pharmaceutical composition which includes methantheline bromide and a polymer of a monomer mixture of a monoester of acrylic acid and/or methacrylic acid and a polyhydric alcohol; and divinyl benzene.

1 Claim, No Drawings

SUSTAINED RELEASE OF METHANTHELINE

BACKGROUND OF THE INVENTION

The present invention is concerned with a sustained release pharmaceutical composition, and in particular is concerned with a sustained release pharmaceutical composition which contains a water-insoluble but water-swellable hydrophilic polymer of a monomeric mixture containing a monoester of acrylic and/or methacrylic acid; and divinyl benzene.

It has previously been suggested to incorporate drugs into hydrophilic polymers to provide sustained release of the drug. Although a wide variety of suitable polymers and applicable drugs have previously been suggested, only a very limited number of combinations of particular drugs and particular polymers have to date been successful in providing sustained release characteristics. In addition, various combinations which provide sustained release require mixtures of substituents in combination with the drug.

It has become quite evident that not any combination of any drug and any hydrophilic polymer will provide a sustained release pharmaceutical composition. The preparation of sustained release pharmaceutical compositions from only a polymer and a drug is highly empirical. The art has not advanced to the stage where a person skilled in the art can predict whether a particular combination of a drug and hydrophilic polymer will produce a sustained release pharmaceutical composition.

Accordingly, it is an object of the present invention to provide a suitable sustained release pharmaceutical composition. It is a further object of the present invention to provide a sustained release pharmaceutical composition which requires only the pharmacological material and the hydrophilic polymer and does not require the presence of auxiliary constituents.

SUMMARY OF THE INVENTION

The present invention is concerned with a sustained release pharmaceutical composition comprising:

A. a matrix of a water-insoluble but water-swellable hydrophilic polymer of a monomer mixture containing:
 1. polymerizable monoester of acrylic and/or methacrylic acid and a polyhydric alcohol; and
 2. divinyl benzene; and wherein the monomer mixture contains from about 90 to about 99.9% by weight of (1); and from about 0.1 to about 10% by weight of (2) based upon the total weight of (1) and (2) in the monomer mixture; and B. methantheline bromide in an amount sufficient for the total dosage requirement during a treatment period; and being entrapped in said matrix.

DESCRIPTION OF PREFERRED EMBODIMENTS

The polymerizable monoesters which are suitable in obtaining the polymers employed in the present invention must be water-miscible. Such polymerizable monoesters are monoesters of either acrylic and/or methacrylic acid and a polyhydric alcohol and preferably a dihydric alcohol. Suitable dihydric alcohols which may be employed to form the esters used in the present invention include among others ethylene glycol, 1,3-propanediol, the dialkylene glycols such as diethylene glycol and dipropylene glycol; and the polyalkylene glycols such as polyethylene glycol and polypropylene glycol; 1,6-hexamethylene glycol; and 1,4-butanediol. Some suitable polyhydric alcohols which contain from 0 to 6 to alcohol groups and which may be employed to form the ester used in the present invention include glycerol, trimethylol propane, trimethylolethane, pentaerythritol, and hexitols such as mannitol and sorbitol. Examples of some suitable polymerizable monoesters include 2-hydroxy ethyl methacrylate, 2-hydroxy ethyl acrylate, 2-hydroxy propyl methacrylate, diethylene glycol monomethacrylate, diethylene glycol monoacrylate, 2-hydroxy propyl acrylate, 3-hydroxy propyl methacrylate, 3-hydroxy propyl acrylate, dipropylene glycol monomethacrylate, glyceryl methacrylate, and pentaerythritol methacrylate, with the preferred polymerizable monoester being 2-hydroxy ethyl methacrylate. The amount of polymerizable monoester employed in the monomeric mixture to prepare the polymers of the present invention is usually from about 90 to about 99.9% by weight, and is preferably from about 95 to about 99.8% by weight, based upon the total weight of the polymerizable monoester, and divinyl benzene. The most preferred amount of monoester is about 99.5% by weight based upon the total weight of the monoester and divinyl benzene.

The divinyl benzene employed in preparing the polymers used in the present invention is usually present in amounts from about 0.1 to 10% by weight. The preferred amount of divinyl benzene is between about 0.2 and about 5% by weight, and the most preferred amount is about 0.5% by weight.

Methantheline bromide, which is the drug employed according to the present invention, is generally used in amounts of about 0.1 to about 50%, preferably from about 0.5 to about 35% and most preferably from about 1 to about 30% by weight based upon the total weight of the methantheline bromide and the water-insoluble but water-swellable hydrophilic polymer. The water-insoluble but water-swellable hydrophilic polymer is generally employed in amounts of about 50 to about 99.9%, preferably from about 65 to about 99.5% by weight, and most preferably from about 70 to about 99% by weight based upon the total weight of the methantheline bromide and water-insoluble but water-swellable hydrophilic polymer.

In addition, the pharmaceutical compositions of the present invention can include such other materials as plasticizers, inert fillers, and suspending aids such as Cab-O-Sil and bentone for the methantheline bromide.

Moreover, the compositions of the present invention can be further encapsulated by another polymeric or other film-forming substance according to particular applications of the composition. Such auxiliary encapsulating layers can be soluble or insoluble in aqueous medium, the solubility or swelling being dependent or independent of pH and/or ionic strength, and can be susceptible or non-susceptible to enzymatic action.

The pharmaceutical compositions of the present invention can be prepared by admixing the methantheline bromide or an aqueous solution thereof and the monomeric mixture containing the polymerizable monoester, and divinyl benzene; and then by polymerizing to provide a matrix of the water-insoluble but water-swellable polymer entrapping the methantheline bromide. The pharmaceutical compositions of the present invention can also be prepared by contacting the methantheline bromide with the water-insoluble but water-swellable polymer such as by immersing the polymer in a bath such as an aqueous bath of the drug to cause diffusion of the methantheline bromide into the polymer matrix. Generally the methantheline bromide is contacted with the polymer for at least about 15 minutes to cause diffusion into the polymer matrix. Of course, this can vary greatly depending upon the relative amounts of the ingredients.

The water-swellable polymers employed in the present invention generally can be prepared by employing bulk polymerization techniques. The term "bulk polymerization" as used herein includes those polymerizations carried out in the absence of a solvent or dispersing liquid as well as those polymerizations carried out in the presence of water or water-soluble or polymer-soluble liquid swelling agents in such amounts as not to significantly alter the nature of the polymerization process.

The polymerization catalyst employed can be any of the catalysts which are suitable in polymerizing compounds containing ethylenic unsaturation and preferably are the free radical catalysts. Of particular interest are the peroxide catalysts. Some examples of suitable peroxide catalysts include hydrogen peroxide, benzoyl peroxide, tertbutyl peroctoate, phthalic peroxide, succinic peroxide, benzoyl acetic peroxide, tert-butyl peroxy pivalate, coconut oil acid peroxide, lauric peroxide, stearic peroxide, oleic peroxide, tert-butyl hydroperoxide, tetraline hydroperoxide, tert-butyl diperphthalate, cumene hydroperoxide, tert-butyl pebenzoate, acetyl peroxide, 2,4-dichlorobenzoyl peroxide, urea peroxide, caprylyl peroxide, p-chlorobenzoyl peroxide, ditert-butyl peroxide, 2,2-bis(tert-butyl peroxy)butane, hydroxyheptyl peroxide, the diperoxide of benzaldehyde; alkylperoxycarbonates such as diisobutylperoxy bicarbonate, di-secondary butyl peroxy bicarbonate, and tertbutyl peroxyisopropylcarbonate, and the like. The preferred catalyst is one of which is effective at moderately low temperatures such as at about 30°–90° C.

The amount of catalyst employed depends upon the type of catalyst system used and is generally from about 0.01 to about 10 parts by weight per 100 parts of the monomer mixture, and preferably is from about 0.1 to about 1 part by weight per 100 parts of the monomer mixture.

The polymerization is generally carried out at temperatures from about room temperature to about 150° C. It is generally preferred to initiate the polymerization at relatively low temperatures such as from about 35° to about 85° C and then to increase the temperature to about 90° to about 150° C as the reaction proceeds and preferably after most of the reaction has been completed. The most preferred initial temperature range of polymerization is between about 30° and 90° C.

Usually the polymerization is conducted under autogenous pressure in a closed reaction vessel. However, any suitable means to prevent significant evaporation of any of the monomers can be employed.

Generally, the polymerization is completed in about one-half to about 12 hours and preferably is completed in about 4 to about 6 hours. It is understood, of course, that the time and temperature are inversely related. That is, temperatures employed at the upper end of the temperature range will provide polymerization processes which can be completed near the lower end of the time range.

In addition, it may be desirable for the copolymers obtained from such polymerizations to be post cured at temperatures somewhat higher than those initially employed in the polymerization. Usually the temperatures employed in the post cure will range from about 90° to about 150° C. Two hours is usually more than sufficient for such a post curing operation. Preferably the post cure is completed in 2 to 4 hours.

The pharmaceutical compositions of the present invention can be utilized for oral ingestion, implantation, or application a mucous membrane. The pharmaceutical compositions of the present invention can be implanted subcutaneously, constitute a part of a prosthesis, or be inserted in a cavity of the human body. Upon application to the desired part of the body by the desired mode, the pharmaceutical compositions of the present invention provide sustained release of the pharmacological material by diffusion through pores of the water-insoluble but water-swellable polymeric matrix to the desired part of the body upon contact with body fluids.

The present invention makes it possible to obtain a sustained release pharmaceutical composition which requires only the drug and the water-insoluble but water-swellable polymer and does not require the presence of auxiliary constituents. In addition, the sustained release characteristics of the present invention could not be predicted particularly since the polymers employed in this invention did not always provide sustained release compositions. Moreover, when methantheline bromide is employed together with other polymers, a sustained release composition is not always obtained.

The following example is presented to further illustrate the present invention. All parts are by weight unless the contrary is stated.

EXAMPLE 1

A polymeric composition is prepared by admixing about 197.2 parts of 2-hydroxy ethyl methacrylate; about 2 parts of divinyl benzene; and about 0.8 parts of tertbutyl peroctoate. The mixture is heated from about room temperature to about 70° C in 4 hours and then maintained at 70° C for about 8 hours under a nitrogen atmosphere to effect polymerization. The mixture is post cured by heating under atmospheric pressure at 100° C for 2 hours. About 155.2 parts of the resulting polymeric composition are soaked for about 12 hours at ambient temperature in about 5000 parts of isotonic saline solution (0.9% NaCl) containing 100 mg of methantheline bromide per 5 ml of saline solution (0.9% NaCl). The above composition is introduced into a beaker containing 20 milliliters of isotonic saline solution (0.9% NaCl) and the beaker is shaken at a constant temperature of 37° C in a thermostatic water bath shaker. The composition is eluted for 3 hours, dried and then replaced in the beaker and re-eluted. The concentration of eluted methantheline is determined with a Beckman DB-GT spectrophotometer using the maximum absorption of methantheline bromide at 282 nanometers. Elution rates are checked after the initial 3-hour elution period shown below and fresh isotonic saline solution is employed after each reading. The results are listed below.

| Time Hours | Mg of Methantheline Eluted |
|---|---|
| 1 | 1.909 |
| 2 | 1.827 |
| 3 | 1.613 |
| 4 | 1.417 |
| 5 | 1.187 |
| 6 | 1.046 |
| 7 | .796 |
| 25 | 4.749 |
| 27 | .851 |
| 29 | .505 |
| 31 | .251 |
| 33 | .184 |

What is claimed is:

1. A sustained release oral ingestion 33 hour methantheline eluting pharmaceutical composition comprising:
    A. polymerized and cured matrix of water-insoluble but water-swellable hydrophilic polymer of a monomer mixture containing:
        1. 2-hydroxyethyl methacrylate; and
        2. divinyl benzene wherein said monomer mixture contains about 197.2 parts by weight of (1) per about 2 parts by weight of (2); and
    B. said polymerized and cured matrix having been soaked for about 12 hours in isotonic saline solution containing per 5 ml of isotonic saline solution at least about 100 mg of methantheline bromide in an amount sufficient for the total dosage requirement adapted to gradually elute methantheline upon oral ingestion during 33 hours of a treatment period; and thereby the methantheline bromide being entrapped in said matrix.

* * * * *